(12) United States Patent
Mei et al.

(10) Patent No.: US 11,295,727 B2
(45) Date of Patent: Apr. 5, 2022

(54) CONVERSATION-BASED CHATBOT TRAINING

(71) Applicant: INTERNATIONAL BUSINESS MACHINES CORPORATION, Armonk, NY (US)

(72) Inventors: Lijun Mei, Beijing (CN); Qi Cheng Li, Beijing (CN); Xin Zhou, Beijing (CN); Xue Han, Beijing (CN); Yan Fei Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 158 days.

(21) Appl. No.: 16/586,966

(22) Filed: Sep. 28, 2019

(65) Prior Publication Data

US 2021/0097978 A1   Apr. 1, 2021

(51) Int. Cl.
| | |
|---|---|
| *G10L 15/06* | (2013.01) |
| *H04L 51/02* | (2022.01) |
| *G10L 15/22* | (2006.01) |
| *G10L 15/18* | (2013.01) |
| *G06K 9/62* | (2022.01) |
| *G10L 15/183* | (2013.01) |

(52) U.S. Cl.
CPC .......... *G10L 15/063* (2013.01); *G06K 9/6263* (2013.01); *G10L 15/183* (2013.01); *G10L 15/1822* (2013.01); *G10L 15/22* (2013.01); *H04L 51/02* (2013.01); *G10L 2015/0638* (2013.01); *G10L 2015/223* (2013.01); *G10L 2015/225* (2013.01)

(58) Field of Classification Search
CPC ... G10L 15/22; G10L 15/063; G10L 15/1822; G10L 15/183; G10L 2015/0638; G10L 2015/223; G10L 2015/225; G06K 9/6263; H04L 51/02
See application file for complete search history.

(56) References Cited

U.S. PATENT DOCUMENTS 10,467,261 B1 *  11/2019  Doyle ................... G06F 16/248
10,705,796 B1 *   7/2020  Doyle ....................... G06F 7/08
(Continued)

OTHER PUBLICATIONS

Li, J. et al., "Deep Reinforcement Learning for Dialogue Generation", arXiv:1606.01541v4 [cs.CL] Sep. 29, 2016; 11 pgs.

*Primary Examiner* — Michael Colucci
(74) *Attorney, Agent, or Firm* — Intelletek Law Group, PLLC; Gabriel Daniel, Esq.

(57) ABSTRACT

A chatbot system receives utterances of a conversation. The chatbot system constructs a conversation knowledge graph comprising one or more dialogue segments that correspond to utterances of the conversation. The chatbot system identifies a dialogue segment in the conversation knowledge graph having a contextual uncertainty that is detected based on a context model. The chatbot system generates a clarifying question for the identified dialogue segment having the contextual uncertainty. The chatbot system receives a clarifying answer from a user interface of the computing device to the clarifying question. The chatbot system updates the context model and the conversation knowledge graph based on the clarifying question and the clarifying answer to resolve the contextual uncertainty of the identified dialogue segment.

20 Claims, 5 Drawing Sheets

(56) References Cited

U.S. PATENT DOCUMENTS

| | | | |
|---|---|---|---|
| 10,720,150 B2* | 7/2020 | Asumu | G10L 25/51 |
| 2006/0074831 A1* | 4/2006 | Hyder | G06N 5/02 |
| | | | 706/45 |
| 2011/0066634 A1* | 3/2011 | Phillips | G10L 15/22 |
| | | | 707/769 |
| 2015/0066479 A1 | 3/2015 | Pasupalak et al. | |
| 2018/0131645 A1 | 5/2018 | Magliozzi et al. | |
| 2018/0307978 A1* | 10/2018 | Ar | G06N 5/022 |
| 2019/0146965 A1* | 5/2019 | Zack | G06F 16/9535 |
| | | | 707/690 |
| 2019/0339693 A1* | 11/2019 | Menon | G05D 1/0027 |
| 2020/0192306 A1* | 6/2020 | Virani | G05B 13/0275 |
| 2021/0097978 A1* | 4/2021 | Mei | G06F 40/35 |

* cited by examiner

CONVERSATION-BASED CHATBOT TRAINING

BACKGROUND

Technical Field

The present disclosure generally relates to artificial intelligence systems capable of conducting human-like conversations, also known as chatbots.

Description of the Related Arts

A chatbot is a piece of software that conducts a conversation via auditory or textual methods. Such programs are often designed to convincingly simulate how a human behaves as a conversation partner. Chatbots are typically used in dialog systems for purposes such as customer service or information acquisition. Simple chatbots may be implemented by scanning keywords and finding matching replies in a database. Sophisticated chatbots may rely on natural language processing.

SUMMARY

Some embodiments of the disclosure provide a chatbot system receives utterances of a conversation. The chatbot system constructs a conversation knowledge graph that includes one or more dialogue segments that correspond to utterances of the conversation. The chatbot system identifies a dialogue segment in the conversation knowledge graph having a contextual uncertainty that is detected based on a context model. The chatbot system generates a clarifying question for the identified dialogue segment having the contextual uncertainty. The chatbot system receives a clarifying answer from a user interface of the computing device to the clarifying question. The chatbot system updates the context model based on the clarifying answer to resolve the contextual uncertainty of the identified dialogue segment.

The contextual uncertainty may be detected when the context model is unable to determine an intent or an entity of the dialogue segment, or when the context model is unable to determine whether two dialogue segments in the conversation knowledge graph are distinct. In some embodiments, the clarifying question is generated by a machine learning model that is trained by answer-question pairs with their corresponding contexts.

In some embodiments, the chatbot system poses the clarifying question at the user interface and receives the clarifying answer at the user interface. The chatbot system may update the context model based on the clarifying answer by mapping the clarifying question and the clarifying answer to a response action with regard to the context model or the conversation knowledge graph. The response action may include adding, updating, or deleting a dialogue segment of the conversation knowledge graph. The response action may also include updating the context model to be able to identify an intent or an entity of the dialogue segment having the contextual uncertainty.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

When teaching a chatbot to converse, logs of chats, or chat logs, can be used to train the chatbot. Chat logs may be histories of human-to-human conversations. However, it is difficult to define generalized rules for using human conversation to train chatbots. Some embodiments of the disclosure provide a chatbot system that trains chatbots by using active questioning of a subject-matter expert (SME). Specifically, conversation histories or records of conversations (e.g., chat logs) are analyzed to enrich incomplete questions and answers. To fulfill the question and answer, a systematic context model is used to maintain the conversation. All conversational context are kept by the context model. For each session of human-to-human chat log, intents and entities are extracted and added to the context model. Based on this framework, chatbots are taught to learn to extract dialogue segments with missing intents or entities from human-to-human conversation history. The chatbot system also uses reinforcement learning approach to determine when to pose questions to human expert (SME) when analyzing chat logs.

In some embodiments, chatbot system receives utterances of a conversation. The chatbot system constructs a conversation knowledge graph comprising one or more dialogue segments that correspond to utterances of the conversation. The chatbot system identifies a dialogue segment in the conversation knowledge graph having a contextual uncertainty that is detected based on a context model. The chatbot system generates a clarifying question for the identified dialogue segment having the contextual uncertainty. The chatbot system receives a clarifying answer from a user interface of the computing device to the clarifying question. The chatbot system updates the context model based on the clarifying answer to resolve the contextual uncertainty of the identified dialogue segment.

The chatbot system learns from records of conversations and resolves contextual uncertainty by generating clarifying questions to be answered by a human expert. This accelerates the learning by the chatbot by focusing on the contextual uncertainty detected by the chatbot. The computation efficiency of chatbot system is therefore improved.

Figure 1:
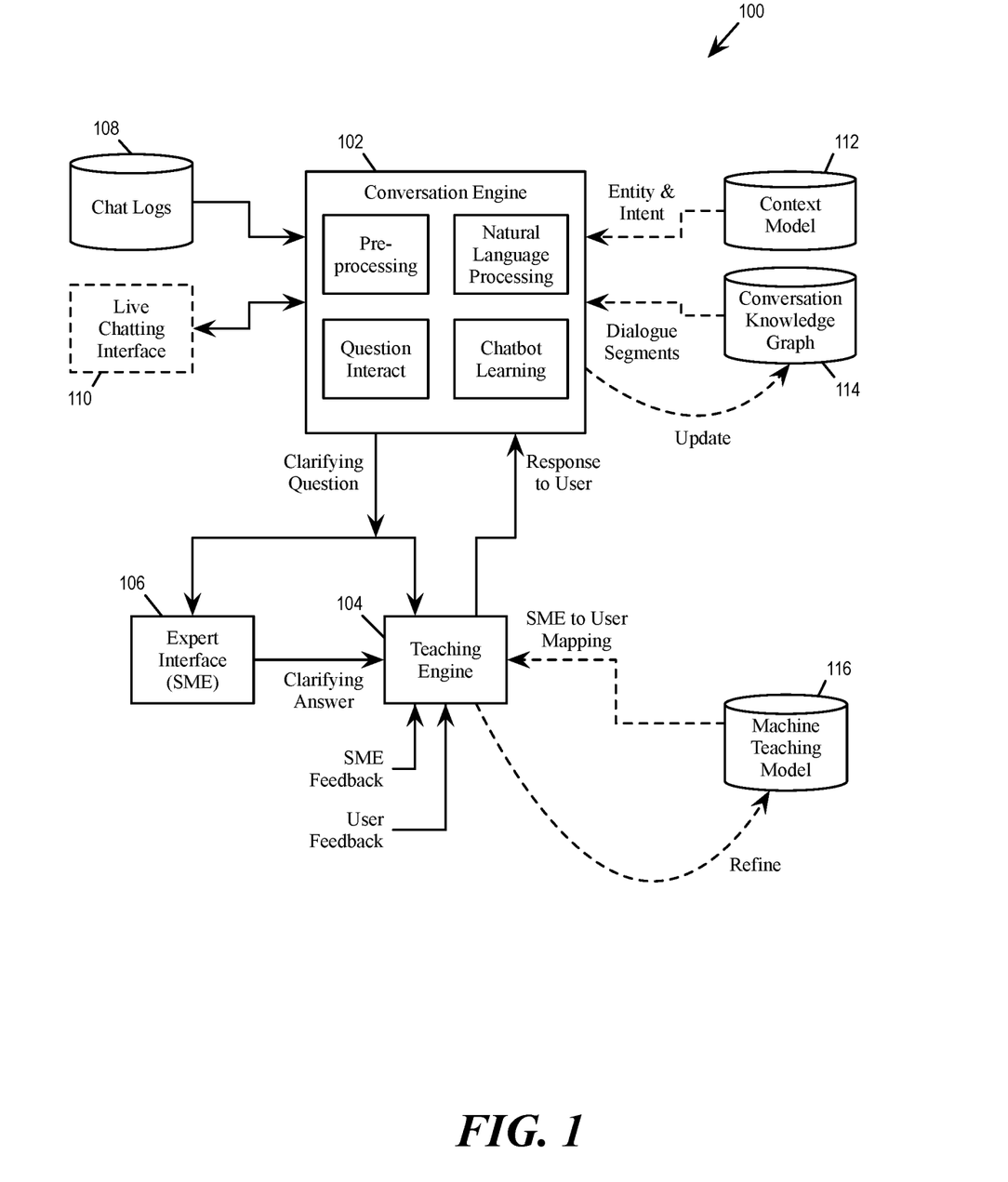
FIG. 1 illustrates a chatbot system that learns from records of conversations and resolves contextual uncertainties by generating clarifying questions to be answered by a subject matter expert (SME).

For some embodiments, FIG. 1 illustrates a chatbot system 100 that learns from records of conversations and resolves contextual uncertainties by generating clarifying questions to be answered by a SME. The chatbot system 100 includes a conversation engine 102, a teaching engine 104, and an expert interface 106. The conversation engine 102 receives records or histories of conversations (e.g., chat logs) 108 or live conversation through a live-chatting interface 110. The chatbot system 100 maintains storage 112 for context models, storage 114 for conversation knowledge graphs, and storage 116 for a machine teaching model.

In some embodiments, the conversation engine 102, the teaching engine 104, and the expert interface 106 are modules of software instructions being executed by one or more processing units (sometimes collectively referred to herein as a processor) of a computing device. In some embodiments, the modules 102-106 are modules of hardware circuits implemented by one or more integrated circuits (ICs) of an electronic apparatus. Though the modules 102, 104, and 106 are illustrated as being separate modules, some of the modules can be combined into a single module. An example computing device or data processing system 500 that may implement the chatbot system 100 will be described by reference to FIG. 5 below.

The conversation engine 102 is a module that may learn how to converse or chat from the chat logs 108. The conversation engine 102 may also learn from live conversation through the live-chatting interface 110. The learned conversation capability is retained by the conversation engine 110 as content of the context model storage 112 and the conversation knowledge graph storage 114. The conversation engine 102 updates context models and the conversation knowledge graphs in storages 112 and 114 respectively as it processes or experiences utterances of conversations.

The conversation engine 102 identifies the implied or expressed contexts of the conversations in the chat logs 108 and updates the context models in the context model storage 112 to incorporate the identified contexts. The conversation engine 102 learns how to conduct a conversation regarding a particular topic by storing the utterances related to the particular topic in a conversation knowledge graph for the topic. The storage 114 may store multiple different conversation knowledge graphs for multiple different topics.

Figure 2:
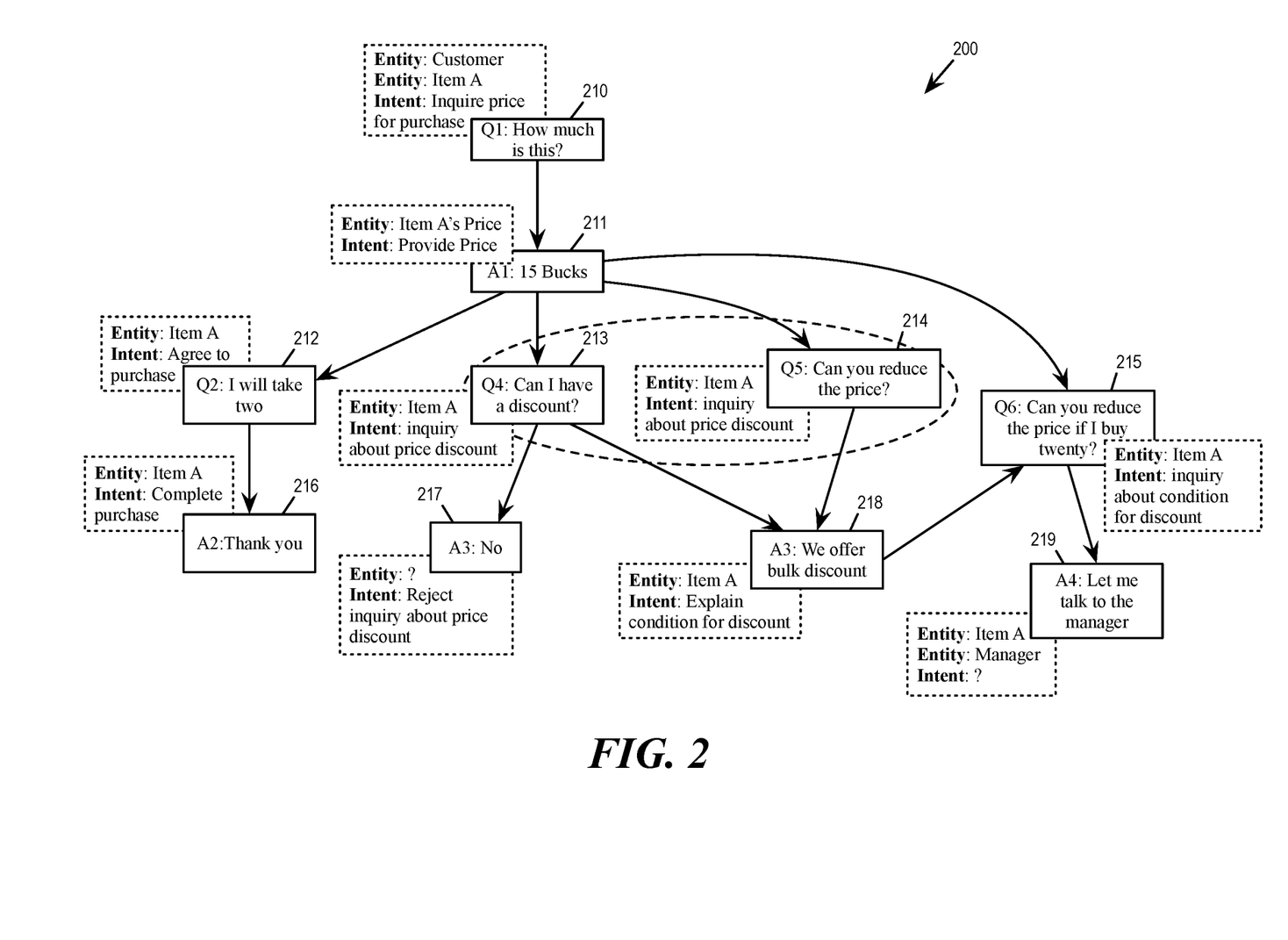
FIG. 2 conceptually illustrates an example conversation knowledge graph, consistent with an exemplary embodiment.

FIG. 2 conceptually illustrates an example conversation knowledge graph 200, consistent with an exemplary embodiment. The conversation knowledge graph 200 is a learned flow of utterances used by the chatbot system 100 to conduct a conversation regarding the purchase of a particular item. Each utterance is an expression of intent regarding one or more entities by one participant (e.g., buyer or seller) of a conversation. Each utterance is represented by a dialogue segment in the conversation knowledge graph 200, and the conversation knowledge graph 200 specifies the logical relationship between the different dialogue segments. As illustrated, the conversation graph 200 includes dialogue segments 210-219. The dialogue segments 210-219 are created and added to the conversation graph 200 as the conversation engine 102 processes the content of the chat logs 108 and encounters utterances regarding negotiation for sale of an item.

The logical relationships between utterances are illustrated as flow arrows between the dialogue segments 210-219. For example, the dialogue segment 210 is a question ("how much is this") that is logically followed by the dialogue segment 211 that is a response ("15 bucks") to the question. A dialogue segment may be logically followed by more than one possible dialogue segments. For example, the dialogue segment 211 is a response that has four different possible follow up questions in dialogue segments 212-215, and the dialogue segment 213 is a follow-up question having two different possible responses in dialogue segments 217 and 218. A dialogue segment may also logically follow two or more different segments. For example, the dialogue segment 215 is a follow-up question that may logically follow the statement of the dialogue segment 211 and the statement of the dialogue segment 218.

In some embodiments, the conversation engine 102 uses the context models to determine the context of each dialogue segment. The conversation engine 102 includes natural language processing capabilities to identify intent of the speaker and entities being referenced by an utterance, by e.g., examining portions of the conversation before and after the particular utterance. These identified intents and entities are stored in (or learned by) the context models maintained (at the storage 112) by the conversation engine 102. As illustrated in FIG. 2, the dialogue segments of the conversation knowledge graph 200 are associated with intents and entities that are determined for the utterances of the dialogue segments.

When processing the chat logs 108, the conversation engine 102 may encounter utterances whose context is uncertain, e.g., neither the natural language processing capability nor the context modeling of the conversation engine 102 is able to determine the context of the corresponding dialogue segment. In the example, the conversation engine 102 is not able to determine an entity of the dialogue segment 217. The conversation engine 102 is also not able to determine an intent of the dialogue segment 219. The conversation engine 102 regards the dialogue segments 217 and 219 as having contextual uncertainties.

In some embodiments, the conversation engine seeks to economize the conversation knowledge graph by consolidating disparate dialogue segments that are functionally the same or not distinct. For example, the dialogue segment 213 ("can I have a discount") and the dialogue segment 214 ("can you reduce the price") have similar meaning and may be consolidated. In some embodiments, the conversation engine 102 may not know whether it is permissible to consolidate and therefore identifies the two dialogue segments as a contextual uncertainty.

In some embodiments, when a contextual uncertainty is detected, the conversation engine 102 (or the chatbot system 100 generally) generates a clarifying question to solicit a clarifying answer. The clarifying question may be posed to a human user or a SME. An answer from the human user or SME is then used to update the context model to resolve the uncertainty.

Figure 3A:
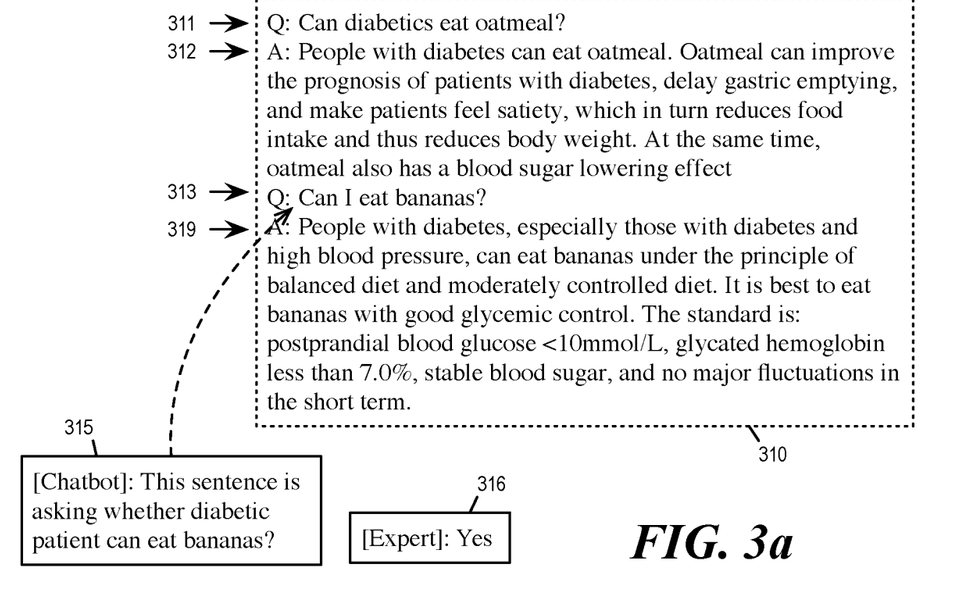
FIGS. 3a-b illustrates examples of the chatbot system generating clarifying questions in order to resolve contextual uncertainties while processing conversations.
Figure 3B:
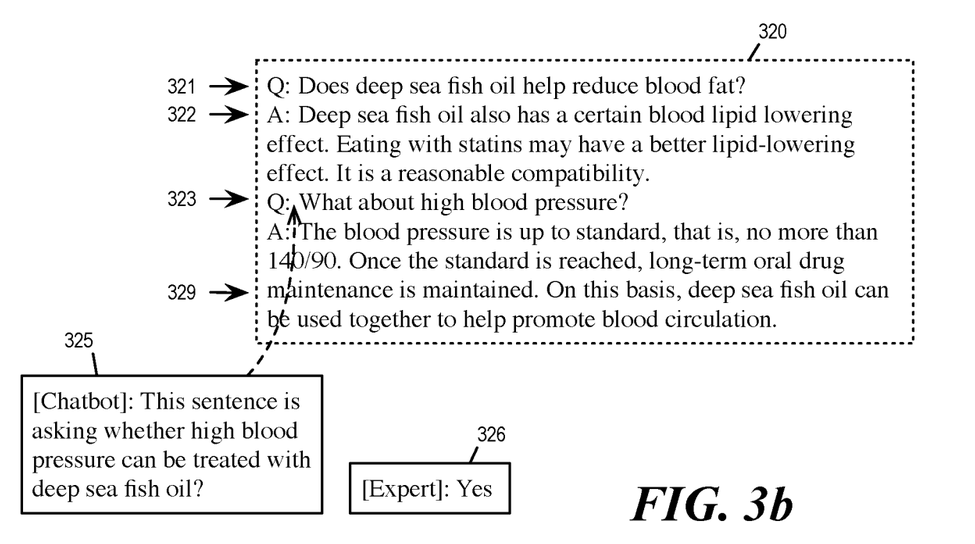

FIGS. 3a-b illustrate examples of the chatbot system generating clarifying questions in order to resolve contextual uncertainties while processing conversations. Each of FIGS. 3a-b illustrates a conversation being processed by the conversation engine 102. The conversation may be offline, i.e., the conversation occurred in the past and the chatbot system 100 is processing the history of the conversation. The conversation may also be online, i.e., the conversation is ongoing and the chatbot system 100 is actively conducting the conversation. Each of the FIGS. 3a-b shows a fragment of a conversation. The utterances of the conversation fragment may already be represented by corresponding dialogue segments in a conversation knowledge graph that is not illustrated.

FIG. 3a illustrates a conversation fragment 310 regarding diets for people with diabetes. A question 311 is posed to inquire about whether people with diabetes can eat oatmeal. An answer 312 responded with information regarding effects of oatmeal on people with diabetes. A follow up question 313 then asked whether the questioner can eat bananas. This poses a contextual uncertainty to the conversation engine 102, because it is uncertain to the chatbot system whether question is still about people with diabetes.

To resolve the uncertainty, the conversation engine 102 generates a clarifying question 315 regarding the context of the question 313. The question is posed to a human expert (e.g., SME), who provided a clarifying answer 316. The conversation engine correspondingly updates the context model so that the conversation engine understand that the intent of the question 313 is to find out whether a diabetic patient can eat bananas. The conversation fragment shows a subsequent reply 319 that provide information regarding eating bananas for diabetic patients.

FIG. 3b illustrates a conversation fragment 320 regarding deep sea fish oil. A question 321 is posed to inquire whether deep sea fish oil help reduce blood fat. An answer 322 responded with information regarding blood lipid lowering effects of deep sea fish oil. A follow up question 323 then asked about high blood pressure. This poses a contextual uncertainty to the conversation engine 102, because it is uncertain to the chatbot system whether question is about deep sea fish oil and high blood pressure.

To resolve the uncertainty, the conversation engine 102 generates a clarifying question 325 regarding the intent of the question 323. The question is posed to a human expert, who provided a clarifying answer 326. The conversation engine correspondingly updates the context model so that the conversation engine understands that the intent of the question 323 is to find out whether deep sea fish oil helps reduce high blood pressure. The conversation fragment 320 shows a subsequent reply 329 that provides information regarding deep sea fish oil and blood pressure.

In some embodiments, the conversation engine 102 uses machine learning to determine whether to generate a clarifying question and how to generate the clarifying question. In some embodiments, answer-question pairs with their contexts are extracted from chat logs. Co-references and contexts are resolved and ambiguities are identified for clarification. A human expert may intervene to help resolve co-references and explain the rationale behind questions, e.g., how does a question arise from prior answer and questions. The extracted answer-question pairs are normalized, e.g., by clustering or categorizing common question types (based on e.g., date, people). The answer-question pairs are extended at multi-level entity abstraction and reduced to common tagged patterns. In some embodiments, ontology models are used to extend the answer-question pairs. The ontology models may be created based on domain knowledge and chat logs with defined content concepts or semantics. The answer-question pairs may be extended according to an answer-question template constructed from patterns of question-answer flows. The extended answer-question pairs are then used to train a deep neural network model, which is used to predict a question based on a given answer. In some embodiments, evolution of contexts from prior answers are identified and used to train the deep neural network model. The trained deep neural network model may be used to generate hypothetical or possible productive clarifying questions when the conversation engine 102 encounters contextual uncertainties.

As mentioned, the clarifying question generated by the conversation engine may be used to solicit a clarifying answer from an expert. For the example chatbot system 100 of FIG. 1, the expert interface 106 is a user interface that is used to pose, convey, or display the clarifying question to a human expert. The expert interface 106 is also used to receive the corresponding clarifying answer from the human expert. The chatbot system 100 uses the clarifying answer as the basis to update the context model and/or the conversation knowledge graph. However, the clarifying answer is a human generated answer, so may itself be vague, and therefore may not be directly used to generate updates for context models and/or conversation knowledge graphs.

The teaching engine 104 is used by the chatbot system 100 to map the clarifying question and the clarifying answer to a response action with regard to the context model or the conversation knowledge graph. The teaching engine 104 may use the content of the machine teaching model 116 to perform the mapping. The response action may include instructions to add, update, or delete a dialogue segment of a conversation knowledge graph. The response action may also include instructions to update the context model so to be able to identify an intent or an entity for the dialogue segment of the conversation knowledge graph having the contextual uncertainty. When generating the response action, the teaching engine 104 may be configured or trained to locate the correct conversation knowledge graph and the corresponding dialogue segment based on the clarifying question, the clarifying answer, and the content of the machine teaching model 116. In some embodiments, the teaching engine 104 receives feedback from human expert or human user to modify the content of the machine teaching model 116 (i.e., in order to improve the mapping to the response action).

Figure 4:
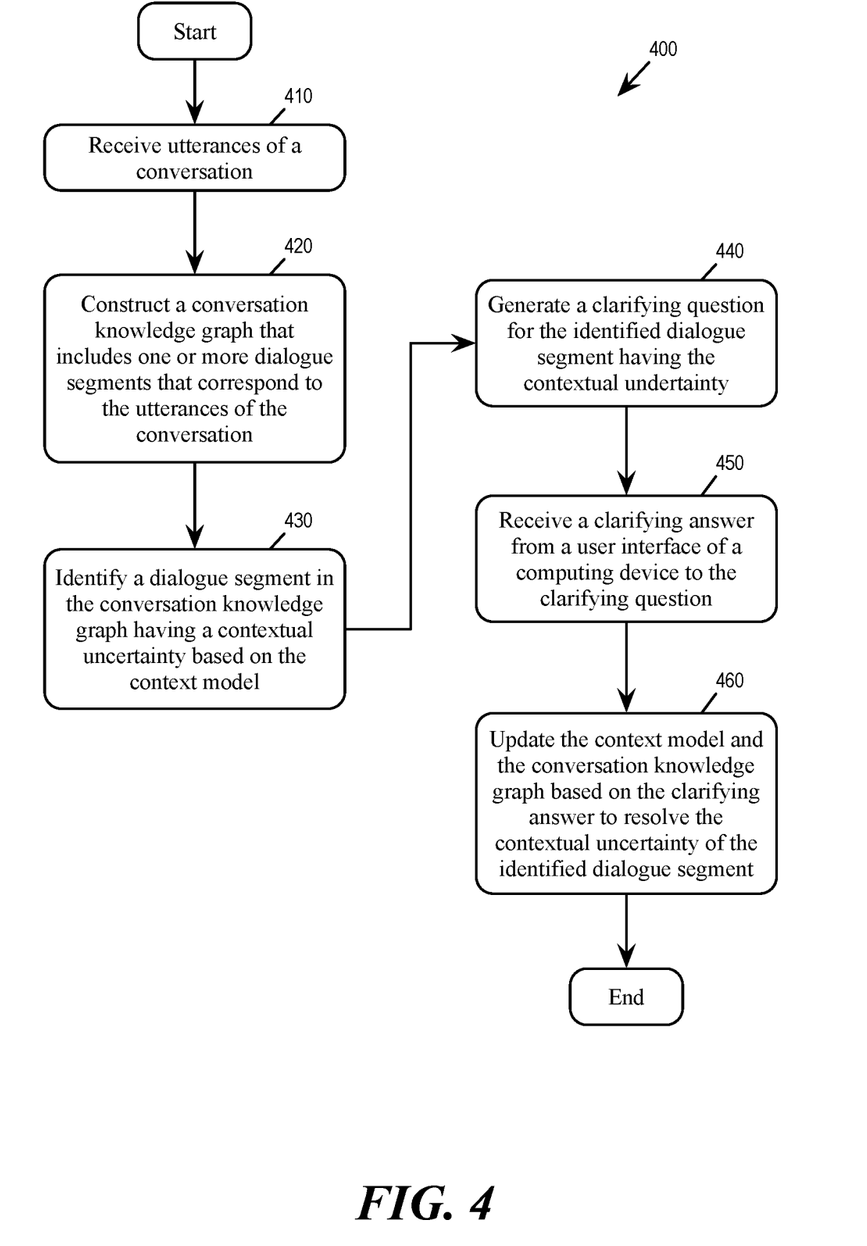
FIG. 4 conceptually illustrates a process for operating a chatbot system, consistent with an exemplary embodiment.

FIG. 4 conceptually illustrates a process 400 for operating a chatbot system, consistent with an exemplary embodiment. The chatbot system learns from records of conversations and resolves contextual uncertainty by generating clarifying questions to be answered by a human expert. In some embodiments, one or more processing units (e.g., processor) of a computing device implementing the chatbot system 100 perform the process 400 by executing instructions stored in a computer readable medium.

The chatbot system receives (at 410) utterances of a conversation. The conversation may be offline, i.e., the conversation occurred in the past and the chatbot system is processing the history of the conversation. The conversation may also be online, i.e., the conversation is ongoing and the chatbot system is actively conducting the conversation.

The chatbot system constructs (at 420) a conversation knowledge graphs that includes one or more dialogue segments that correspond to utterances in a conversation. The conversation knowledge graph also specifies the logical relationship between the different dialogue segments.

The chatbot system identifies (at 430) a dialogue segment in the conversation knowledge graph having a contextual uncertainty that is detected based on the context model. In some embodiments, the contextual uncertainty is detected when the context model is unable to determine an intent or an entity of the dialogue segment. In some embodiments, the contextual uncertainty is detected when the context model is unable to determine whether two dialogue segments in the conversation knowledge graph are distinct.

The chatbot system generates (at 440) a clarifying question for the identified dialogue segment having the contextual uncertainty. In some embodiments, the clarifying question is generated by a machine learning model that is trained by answer-question pairs with their corresponding contexts. The chatbot system receives (at 450) a clarifying answer to the clarifying question. In some embodiments, the chatbot system includes a user interface that is used to pose the clarifying question and to receive the clarifying answer.

The chatbot system updates (at 460) the context model and the conversation knowledge graph based on the clarifying answer to resolve the contextual uncertainty of the identified dialogue segment. In some embodiments, the chatbot system updates the context model and the conversation knowledge graph based on the clarifying answer by mapping the clarifying question and the clarifying answer to a response action with regard to the context model or the conversation knowledge graph. The response action may specify adding, updating, or deleting a dialogue segment of the conversation knowledge graph. The response action may also specify updating the context model to be able to identify an intent or an entity of the dialogue segment having the contextual uncertainty.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 4) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
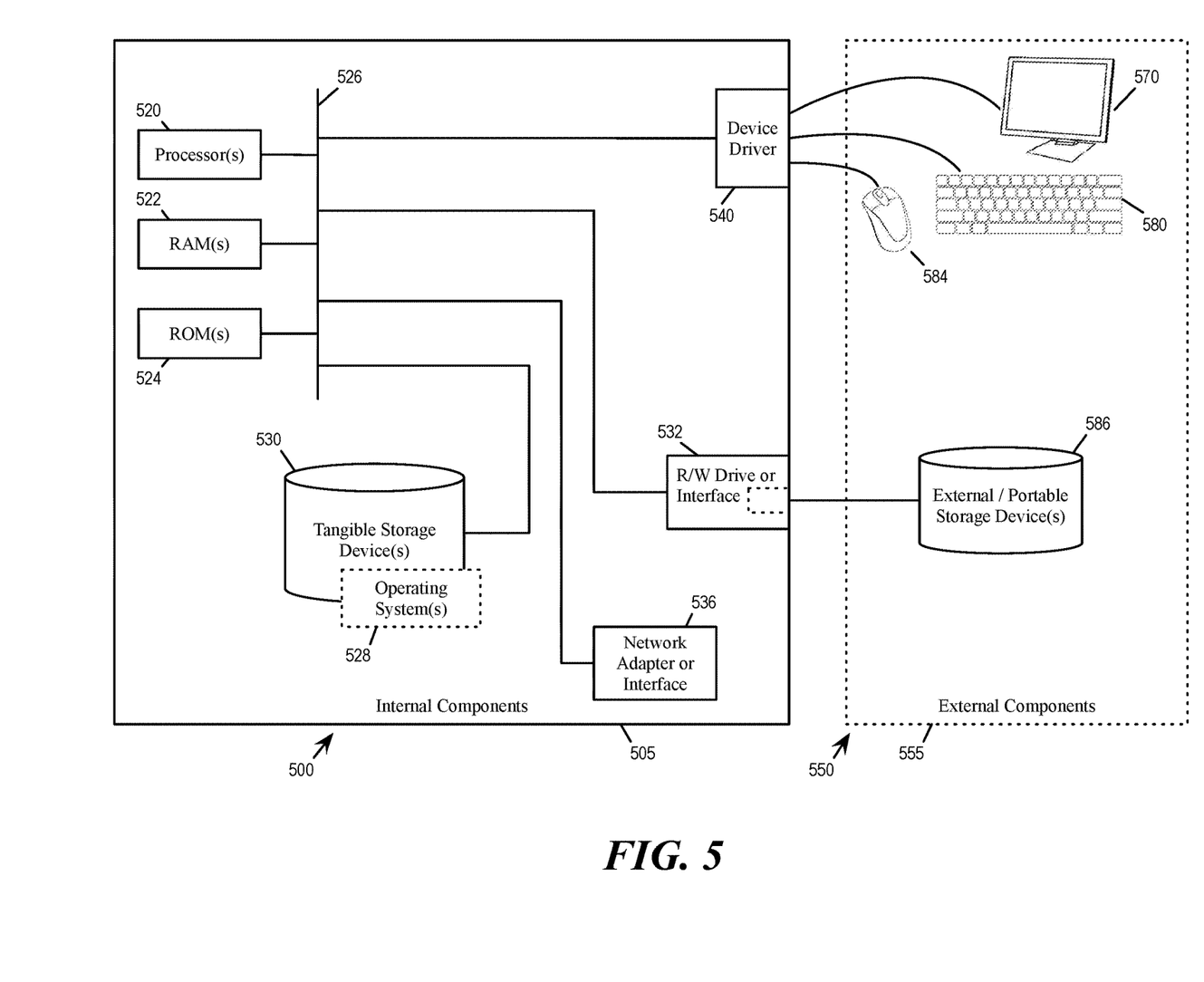
FIG. 5 shows a block diagram of the components of a data processing system in accordance with an illustrative embodiment of the present disclosure.

FIG. 5 shows a block diagram of the components of data processing systems 500 and 550 that may be used to implement a chatbot system (e.g., the chatbot system 100) in accordance with an illustrative embodiment of the present disclosure. The chatbot system learns from records of conversations and resolves contextual uncertainty by generating clarifying questions to be answered by a human expert. It should be appreciated that FIG. 5 provides only an illustration of one implementation and does not imply any limitations with regard to the environments in which different embodiments may be implemented. Many modifications to the depicted environments may be made based on design and implementation requirements.

Data processing systems 500 and 550 are representative of any electronic device capable of executing machine-readable program instructions. Data processing systems 500 and 550 may be representative of a smart phone, a computer system, PDA, or other electronic devices. Examples of computing systems, environments, and/or configurations that may represented by data processing systems 500 and 550 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 500 and 550 may include a set of internal components 505 and a set of external components 555 illustrated in FIG. 5. The set of internal components 505 includes one or more processors 520, one or more computer-readable RAMs 522 and one or more computer-readable ROMs 524 on one or more buses 526, and one or more operating systems 528 and one or more computer-readable tangible storage devices 530. The one or more operating systems 528 and programs such as the programs for executing the process 400 are stored on one or more computer-readable tangible storage devices 530 for execution by one or more processors 520 via one or more RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

The set of internal components 505 also includes a R/W drive or interface 532 to read from and write to one or more portable computer-readable tangible storage devices 586 such as a CD-ROM, DVD, memory stick, magnetic tape, magnetic disk, optical disk or semiconductor storage device. The instructions for executing the process 400 can be stored on one or more of the respective portable computer-readable tangible storage devices 586, read via the respective R/W drive or interface 532 and loaded into the respective hard drive 530.

The set of internal components 505 may also include network adapters (or switch port cards) or interfaces 536 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 536. From the network adapters (or switch port adaptors) or interfaces 536, the instructions and data of the described programs or processes are loaded into the respective hard drive 530. The network may comprise copper wires, optical fibers, wireless transmission, routers, firewalls, switches, gateway computers and/or edge servers.

The set of external components 555 can include a computer display monitor 570, a keyboard 580, and a computer mouse 584. The set of external components 555 can also include touch screens, virtual keyboards, touch pads, pointing devices, and other human interface devices. The set of internal components 505 also includes device drivers 540 to interface to computer display monitor 570, keyboard 580 and computer mouse 584. The device drivers 540, R/W drive or interface 532 and network adapter or interface 536 comprise hardware and software (stored in storage device 530 and/or ROM 524).

The foregoing one or more embodiments implement a chatbot system within a computer infrastructure by having one or more computing devices generating and updating context models and conversation knowledge graphs that are maintained in a computer-readable storage device. The computer infrastructure is further used to detect contextual uncertainties and generate clarifying questions. The computer infrastructure is further used to map the clarifying questions and clarifying answers to response action that include updates to the conversation knowledge graphs and the context models.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
a processor; and
a storage device storing a set of instructions, wherein an execution of the set of instructions by the processor configures the computing device to perform acts by a chatbot system, comprising:
receiving utterances of a conversation;
constructing a conversation knowledge graph comprising one or more dialogue segments that correspond to the utterances of the conversation;
identifying a dialogue segment in the conversation knowledge graph having a contextual uncertainty based on a context model;
generating a clarifying question to a subject matter expert (SME) for the identified dialogue segment having the contextual uncertainty, wherein the clarifying question is separate from the received utterances of the conversation;
receiving a clarifying answer from the SME to the clarifying question; and
updating, by the chatbot system, the context model based on the clarifying answer to resolve the contextual uncertainty of the identified dialogue segment.

2. The computing device of claim 1, wherein the utterances of the conversation are received from an off-line record of the conversation.

3. The computing device of claim 1, wherein the utterances of the conversation are received from an on-line source of the conversation.

4. The computing device of claim 1, wherein the contextual uncertainty is detected when the context model is unable to determine an intent or an entity of the dialogue segment.

5. The computing device of claim 1, wherein the contextual uncertainty is detected when the context model is unable to determine whether two dialogue segments in the conversation knowledge graph are distinct.

6. The computing device of claim 1, wherein the acts further comprise posing the clarifying question at a user interface and receiving the clarifying answer at the user interface.

7. The computing device of claim 1, wherein updating the context model based on the clarifying answer comprises mapping the clarifying question and the clarifying answer to a response action with regard to the context model or the conversation knowledge graph.

8. The computing device of claim 7, wherein the response action comprises at least one of adding, updating, and deleting a dialogue segment of the conversation knowledge graph.

9. The computing device of claim 7, wherein the response action comprises updating the context model to be able to identify an intent or an entity of the dialogue segment having the contextual uncertainty.

10. A computer program product comprising:
one or more non-transitory computer-readable storage devices and program instructions stored on at least one of the one or more non-transitory storage devices, the program instructions executable by a processor, the program instructions comprising sets of instructions to perform by a chatbot system, comprising:
receiving utterances of a conversation;
constructing a conversation knowledge graph comprising one or more dialogue segments that correspond to the utterances of the conversation;
identifying a dialogue segment in the conversation knowledge graph having a contextual uncertainty based on a context model;
generating a clarifying question to a subject matter expert (SME) for the identified dialogue segment having the contextual uncertainty, wherein the clarifying question is separate from the received utterances of the conversation;
receiving a clarifying answer from the SME to the clarifying question; and
updating, by the chatbot system, the context model based on the clarifying answer to resolve the contextual uncertainty of the identified dialogue segment.

11. The computer program product of claim 10, wherein the contextual uncertainty is detected when the context model is unable to determine an intent or an entity of the dialogue segment.

12. The computer program product of claim 10, wherein the sets of instructions further comprise posing the clarifying question at a user interface and receiving the clarifying answer at the user interface.

13. The computer program product of claim 10, wherein:
updating the context model based on the clarifying answer comprises mapping the clarifying question and the clarifying answer to a response action with regard to the context model or the conversation knowledge graph; and
the response action comprises adding, updating, or deleting a dialogue segment of the conversation knowledge graph and updating the context model to be able to identify an intent or an entity of the dialogue segment having the contextual uncertainty.

14. A computer-implemented method performed by a chatbot system, comprising:
receiving utterances of a conversation;
constructing a conversation knowledge graph comprising one or more dialogue segments that correspond to the utterances of the conversation;
identifying a dialogue segment in the conversation knowledge graph having a contextual uncertainty based on a context model;
generating a clarifying question to a subject matter expert (SME) for the identified dialogue segment having the contextual uncertainty, wherein the clarifying question is separate from the received utterances of the conversation;
receiving a clarifying answer from the SME to the clarifying question; and
updating, by the chatbot system, the context model based on the clarifying answer to resolve the contextual uncertainty of the identified dialogue segment.

15. The computer-implemented method of claim 14, wherein the utterances of the conversation are received from an off-line record of the conversation or an on-line source of the conversation.

16. The computer-implemented method of claim 14, wherein the contextual uncertainty is detected when the context model is unable to determine an intent or an entity of the dialogue segment or when the context model is unable to determine whether two dialogue segments in the conversation knowledge graph are distinct.

17. The computer-implemented method of claim 14, wherein the acts further comprise posing the clarifying question at a user interface and receiving the clarifying answer at the user interface.

18. The computer-implemented method of claim 14, wherein updating the context model based on the clarifying answer comprises mapping the clarifying question and the clarifying answer to a response action with regard to the context model or the conversation knowledge graph.

19. The computer-implemented method of claim 18, wherein the response action comprises at least one of adding, updating, and deleting a dialogue segment of the conversation knowledge graph.

20. The computer-implemented method of claim 18, wherein the response action comprises updating the context model to be able to identify an intent or an entity of the dialogue segment having the contextual uncertainty.

* * * * *